Aug. 15, 1939.  E. J. WALSH  2,169,861
STEERING MECHANISM FOR AUTOMOBILES
Filed Dec. 23, 1935
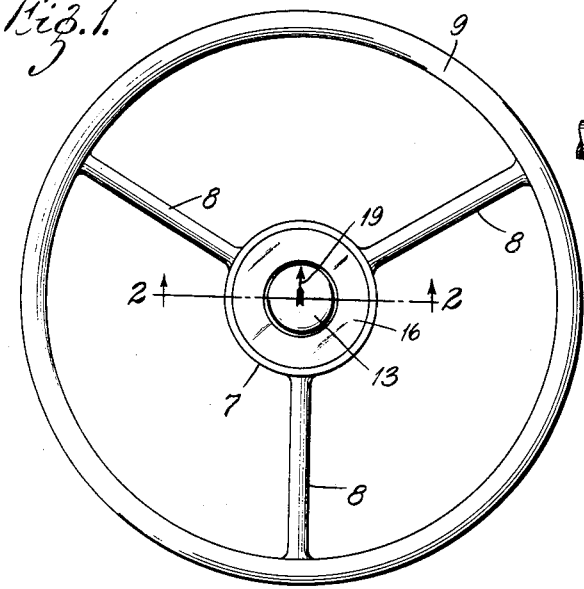
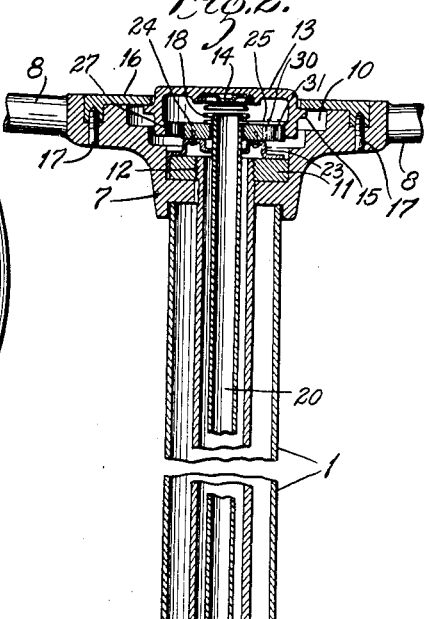
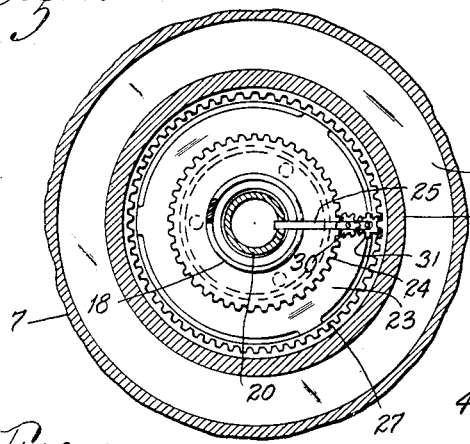
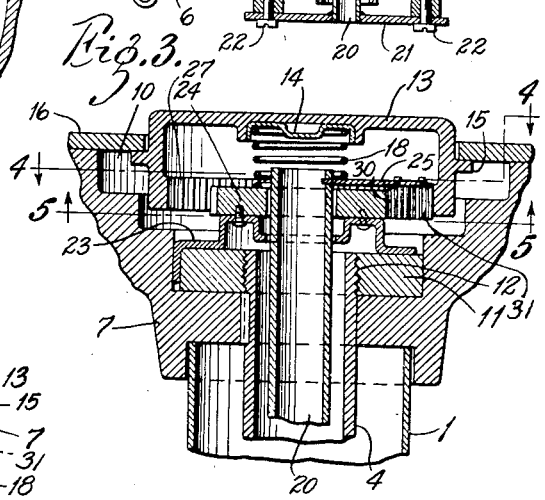
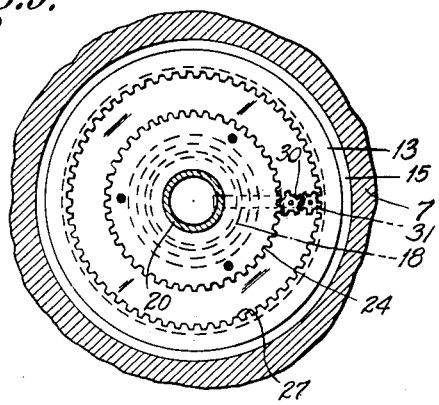
INVENTOR:
EDWARD J. WALSH,
By Lawrence C. Kingsland
ATTORNEY.

Patented Aug. 15, 1939

2,169,861

UNITED STATES PATENT OFFICE 2,169,861

STEERING MECHANISM FOR AUTOMOBILES

Edward J. Walsh, St. Louis, Mo.

Application December 23, 1935, Serial No. 55,828

7 Claims. (Cl. 116—31)

This invention relates generally to steering mechanism for automobiles and more particularly to means actuated by the movement of the steering column to indicate the angular adjustment of the front wheels.

An object of the invention is to provide, in connection with the steering mechanism of an automobile, a simple means actuated by the steering column and readily incorporated therein to indicate to the operator the position to which the front wheels are adjusted for the purpose of controlling the angular movement of the car, particularly toward and away from the curb in the operation of the automobile.

Detailed advantages of the invention will be apparent from the following description thereof, taken in connection with the accompanying drawing in which:

Fig. 1 is a plan view of the steering wheel with the usual horn button located at the axis thereof.

Fig. 2 is a section through the steering mechanism taken on the line 2—2 of Fig. 1.

Fig. 3 is an enlarged view of the upper portion of the steering mechanism showing the parts in section.

Fig. 4 is a horizontal section taken substantially on the line 4—4 of Fig. 3, and Fig. 5 is a horizontal section taken substantially on the line 5—5 of Fig. 3.

In the embodiment of the invention illustrated in the drawing, it is shown as incorporated in the usual steering mechanism common in use as means of adjustment of the front wheels of an automobile.

This mechanism includes generally a column 1 having a housing 2 connected thereto at its lower extremity. This housing, as will be understood, is in connection with a stationary part of the automobile and encases a worm gear 3, mounted adjacent to the lower end of the steering shaft 4, said shaft being preferably in the form of a tube and being journaled for rotatable movement at its lower end in the housing 2. The worm gear operates the gear sector 5 which, in turn, oscillates the steering arm 6 connected in the usual manner with the front wheels of the automobile for adjusting the position thereof by linkage (not shown).

In rigid connection with the upper end of the steering shaft 4 is a hub 7 having the usual radial arms 8 and steering wheel 9 connected thereto. The hub of the steering wheel has an irregularly shaped recess 10, in its upper face and the steering shaft extends into the lower portion of the recess and is connected with the hub of the steering wheel by a nut 11 that has threaded engagement 12 with the upper end of the steering shaft 4, to which it is keyed by a suitable key connection of known construction.

The upper portion of the recess 10 of the hub of the steering wheel receives a horn button 13, the inner surface of which is recessed to receive a spring seat member 14. The horn button is usually provided with a flange 15 which sets under a cover plate 16, having a screw connection 17 with the upper part of the recess 10, whereby the outward movement of the horn button is limited by contact of the flange 15 with the under edge of the wall of an opening in the cover plate 16. A spring 18, having its upper seat in the spring seat member 14, tends to move the horn button outwardly, it being understood that the spring seat member 14 constitutes one contact of the horn circuit, with the other contact (not shown) located therebelow.

The construction thus far described will be recognized as the usual construction of a steering mechanism and it is with this mechanism that the particular construction of the present invention is associated.

It will be understood that the horn button 13 is revoluble in the opening of the plate 16 without interference with its functioning as means for closing the horn circuit. Therefore, as the horn button is revolved, by providing it with an indicator arrow 19, a means is provided for visually indicating the position of the steering mechanism and thereby the angle of the front wheels of the automobile when the horn button is revolved relative to the hub of the steering wheel.

It should be noted that it is preferable, in order that the indicator may be readily read in a subdued light, that the arrow 19 on the top face of the horn button be imprinted thereon in luminous material.

In order to accomplish the relative movement of the horn button in respect to the hub of the steering wheel, a tubular shaft 20 is extended through the steering shaft and terminates below the housing 2. The shaft 20 is rigidly connected with the plate 21 that is held rigid with the bottom face of the housing 2 by screws 22. A bracket 23, carried by the top face of the nut 11, which rotates with the rotation of the steering shaft 4, carries in rigid connection therewith a gear 24. Rigidly connected to the tubular shaft 20 and extending beyond the periphery of the gear 24 is an arm 25 having two small meshing pinions 30 and 31 revolubly supported thereby. The pinion 30 operatively engages the gear 24.

Adjacent to the lower portion of the skirt of the horn button is a ring gear 27, which is engaged by the pinion 31. The train of gearing, comprising the gear 24, the pinion 30, the pinion 31, and the ring gear 27, provides means whereby the rotary motion of the steering shaft 4 will be imparted to the horn button and thereby turn the horn button relative to the opening in the cover plate 16 carried by the hub of the steering wheel. The ring gear 27 and the pinion 31 so cooperatively engage that the former may be moved vertically relative to the latter to secure a conventional horn blowing movement for the horn button 13 without the possibility of disengaging the ring gear 27 from the pinion 31. The gear ratio is such that the horn button will be turned from the zero point in conformity with the angular adjustment of the front wheels so that the direction of the arrow will indicate the direction in which the car will move with such adjustment. Therefore, when the steering wheel is rotated to move the front wheels of the automobile, the degree of movement and the direction of the movement thereof will be indicated by the arrow 19, and the position of the wheels may be thus readily observed from the driver's seat, so that at all times the operator of the automobile will know the angular adjustment of the front wheels and will, therefore, be aided in moving the automobile to a curb and away therefrom in parking or for any purpose that may be advantageous to the operator in determining the position of the front wheels of the automobile.

I am aware that the invention may be modified in certain particulars, and I do not limit myself, therefore, to the exact construction shown and described, but what I desire to secure by Letters Patent is:

1. In a steering mechanism, the combination of a tubular steering shaft and a steering wheel, of a second tubular shaft extending through said steering shaft, a rigid connection at the lower end of said second shaft, a gear fixed to the upper end of said steering shaft, an arm supported by said second shaft, two pinions on said arm, one of which meshes with the said gear, a horn button, and a gear ring fixed to said horn button and meshing with the other of said pinions.

2. In a steering mechanism, the combination of a tubular steering shaft and a steering wheel, of a second tubular shaft extending through said steering shaft, a rigid connection at the lower end of said second shaft, a gear fixed to the upper end of said steering shaft, an arm supported by said second shaft, two pinions on said arm, one of which meshes with said gear, a horn button including a ring gear fixed relative thereto, said other pinion meshing with said ring gear, and an indicating mark carried by said horn button, all of said elements being so cooperatively related that the indicating mark at all times definitely indicates the position of front wheels controlled by the steering mechanism.

3. In a steering mechanism, the combination with a steering wheel and a horn button rotatably mounted therein, and a steering shaft, of a gear fixed relative to said steering shaft for rotation therewith, a ring gear carried by the horn button, and two meshing pinions operatively supported between said gear and ring gear, one of which engages the gear and the other the ring gear whereby said horn button is rotated in the same direction as the steering shaft.

4. In a steering mechanism, the combination with a steering wheel and a horn button rotatably mounted therein, and a steering shaft, of a gear fixed relative to said steering shaft for rotation therewith, a ring gear carried by the horn button, two meshing pinions operatively supported between the gear and ring gear, one of which engages said gear and the other of which engages said ring gear, and indicating means carried by said horn button whereby the position of wheels controlled by the said steering mechanism is indicated at all times.

5. In a steering mechanism, a steering shaft and a steering wheel, a horn button axially supported by the steering wheel and being mounted for vertical and rotary movement, a ring gear carried internally by the horn button, gear and pinion means between said ring gear and the steering shaft, said gear means being carried by and being rotatable with the steering shaft, and a support stationary with respect to said steering shaft carrying said pinion means.

6. In a steering mechanism, a steering shaft and a steering wheel, a horn button supported by and being rotatable and vertically movable with respect to the steering wheel, gear mechanism between the steering wheel and the horn button to effect said relative rotation in a positive manner, said gear mechanism including a gear fixed to said horn button for rotation therewith and indicating means associated with the horn button, all of said elements being so related that the indicating means at all times indicates the position of wheels controlled by the steering mechanism.

7. In a steering mechanism, a steering shaft and a steering wheel, a horn button axially supported by the steering wheel and being mounted for vertical and rotary movement, a ring gear carried internally by the horn button, gear and pinion means between said ring gear and the steering shaft, said gear means being carried and being rotatable with the steering shaft, a support stationary with respect to said steering shaft carrying said pinion means, and indicating means on the horn button, said gearing elements being so related that said indicating means at all times indicates the position of wheels controlled by the steering mechanism.

EDWARD J. WALSH.